Aug. 21, 1962 H. E. R. GRUNER 3,049,966
TWO-STAGE PHOTOGRAMMETRIC RECTIFIER
Filed April 17, 1961 3 Sheets-Sheet 1

INVENTOR.
HEINZ E. R. GRUNER
BY
ATTORNEYS

Aug. 21, 1962 H. E. R. GRUNER 3,049,966
TWO-STAGE PHOTOGRAMMETRIC RECTIFIER
Filed April 17, 1961 3 Sheets-Sheet 3
FIG. 3
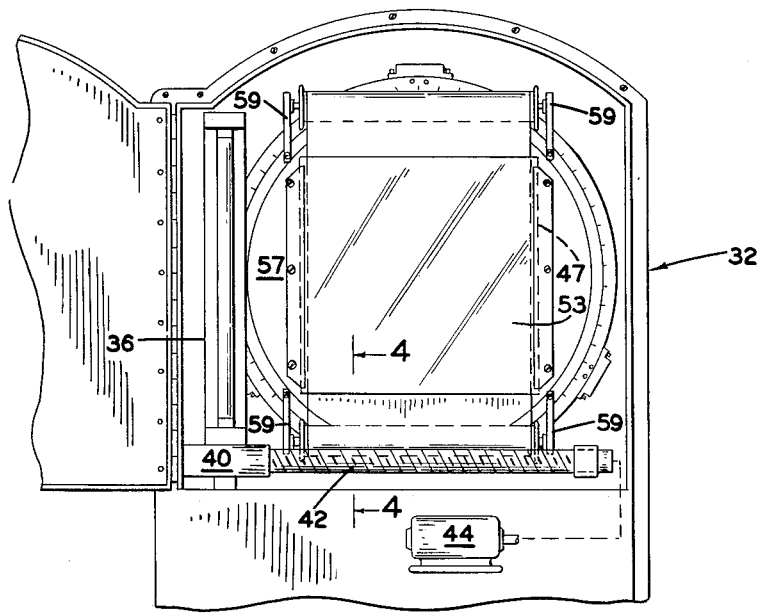
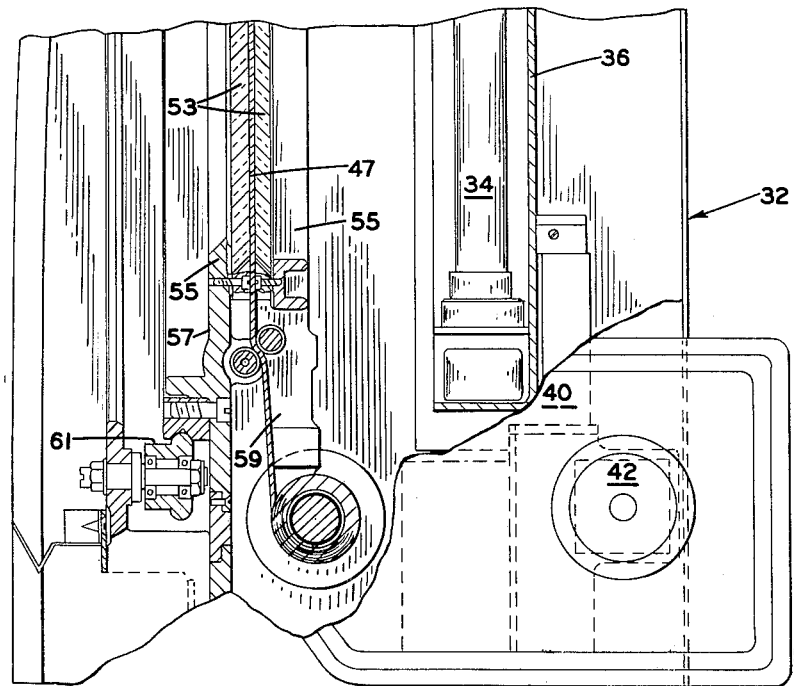
FIG. 4
INVENTOR.
HEINZ E. R. GRUNER
BY Frank C. Parker
Hoffman Stone
ATTORNEYS

United States Patent Office 3,049,966
Patented Aug. 21, 1962

3,049,966
TWO-STAGE PHOTOGRAMMETRIC RECTIFIER
Heinz E. R. Gruner, Irondequoit, N.Y., assignor to Bausch & Lomb Incorporated, Rochester, N.Y., a corporation of New York
Filed Apr. 17, 1961, Ser. No. 103,278
4 Claims. (Cl. 88—24)

This invention relates to a novel photographic rectifier for photogrammetric use including means for simultaneously accomplishing two successive rectifying steps and producing a completely rectified image without the need for making an intermediate transparency or print, even though a relatively large degree of tilt correction of the aerial photographs is required.

Rectification is an important part of photogrammetric mapping work. Aerial photographs are often made at relatively high (sharp) oblique angles, with the result that the relative scale of the photographs varies over the field of view. In order that the photographs may be conveniently used for accurate measurement purposes, rectified prints are made from them in which the relative scale is uniform over the entire field. Previously, when the aerial photographs were initially taken at relatively high oblique angles, it has been necessary, in order to produce a fully rectified print, to go through two or more successive rectification steps, first making an intermediate, partly rectified print upon a transparent base, then chemically developing the print, and finally making a second print from the intermediate one. This procedure is relatively cumbersome and slow, and also involves the chemical development of the intermediate print, in which step a certain loss of photographic quality is suffered.

Accordingly, the principal object of the invention is to provide an improved photogrammetric rectifier capable of carrying out two successive rectifying steps in a single operation.

The apparatus of the present invention enables the achievement of full rectification without the need of making an intermediate, partially rectified print, or transparency, and permits the simultaneous carrying out of two successive stages of rectification.

The practice of the invention is advantageous not only for rectifying photographs that necessarily require two stage rectification, but also for rectifying many photographs that can be rectified in a single stage. In rectification, an unavoidable loss of quality is suffered due to the oblique angles at which the imaging light strikes the photosensitive surface, and such loss becomes increasingly large as the angle of incidence becomes more strongly oblique. In the two stage rectification process of the present invention, the obliquity of the incident imaging light relative to the photosensitive surface is greatly reduced relative to the oblique angle required for rectifying the same photograph in a single stage process.

The invention will now be described in greater detail in conjunction with the accompanying drawings, in which:

FIG. 3 is an elevational view in partly schematic form, showing the film stage and light source arrangement; and, FIG. 4 is a fragmentary cross-sectional view taken along the line 4—4 of FIG. 3.

Figure 1:
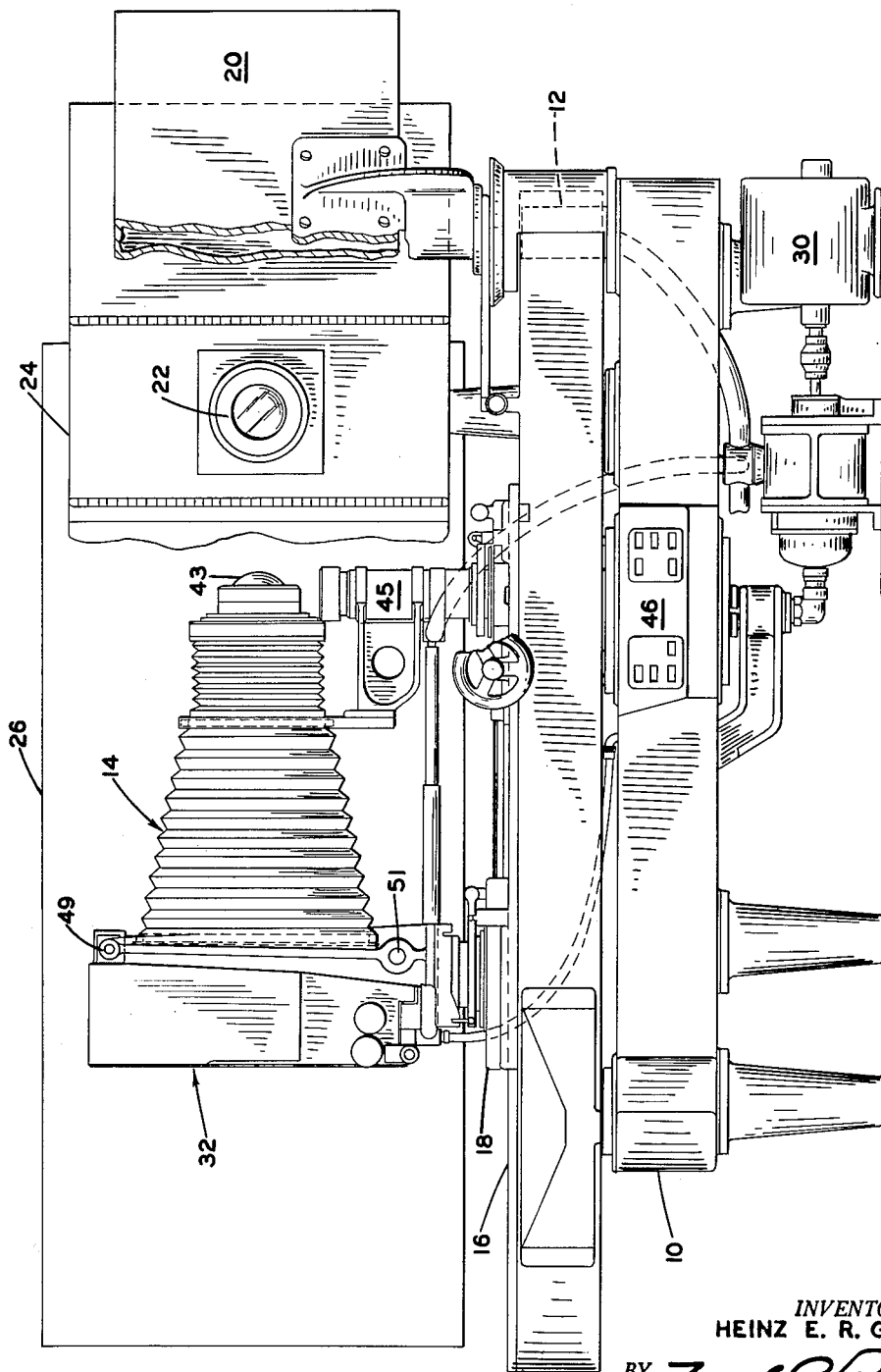
FIG. 1 is a side elevational view of a two-stage photogrammetric rectifier according to the present invention.
Figure 2:
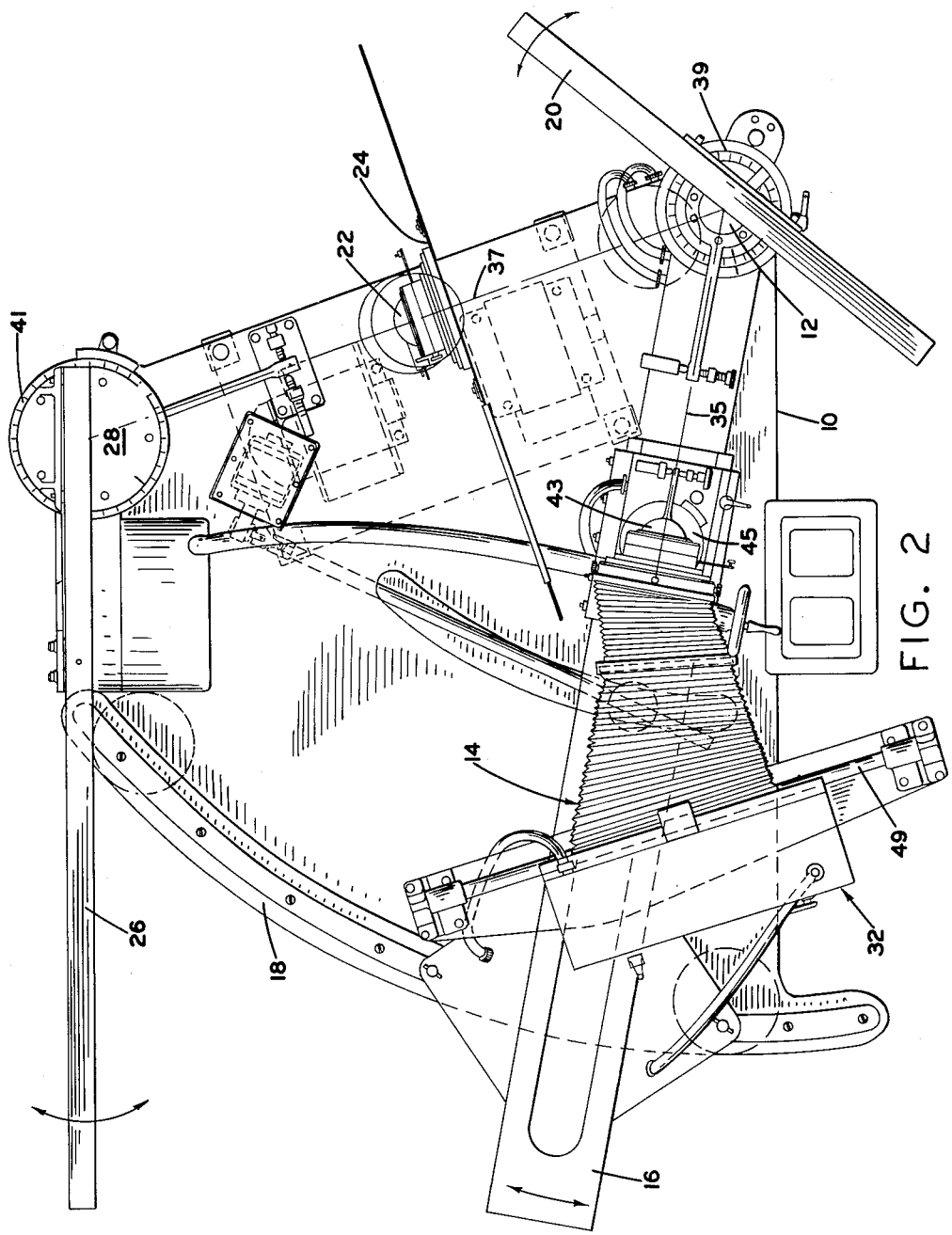
FIG. 2 is a plan view of the rectifier shown in FIG. 1.

A two-stage photogrammetric rectifier according to a preferred embodiment of the invention, and as shown in the drawings includes a relatively heavy, rigid base 10, which supports the optically operative parts of the apparatus. The base 10 is generally triangular in plan, and mounts a primary, vertical pivot 12 at one corner. A photographic projector 14 is mounted upon a beam-like radius arm 16, which is pivoted at one end upon the primary pivot 12, and which is slidably supported adjacent to its other end upon an arcuate rail 18, so that the projector 14 may be swung as a unit about the primary pivot 12.

The first-stage easel 20 is also pivoted upon the primary pivot 12, with its front surface coincident with the pivot axis. The second-stage projection lens 22 is mounted in fixed position upon a lens board 24 between the first-stage easel 20 and the second-stage easel 26, which is pivoted upon a second pivot 28 at a corner of the base 10 opposite from the primary pivot 12.

The easels 20 and 26 may be of any desired construction, but are preferably of the vacuum type, being hollow and having plural spaced perforations (not shown) in their front walls for vacuum retention of the sheet materials upon which the rectified images are projected. For two-stage rectification, a substantially grainless, white diffusion sheet is placed upon the first easel 20, and a photosensitive material such as photographic paper is supported upon the second easel 26.

In the embodiment shown, a common suction pump 30 is provided for maintaining a light vacuum in the two easels 20 and 26, and also for ventilating the lamp housing 32 of the projector. The suction pump 30 may be of any desired type capable of handling sufficient air volume to satisfy the cooling requirements of the lamp 33 and to maintain sufficient suction for the easels. If desired, separate pumps may be used.

The rectifier is operated in accordance with known mathematical principles of photogrammetric rectification, which need not be described in detail herein. Reference may be made to an article by Robert Alterhofen at pages 449–501 of the Manual of Photogrammetry published by the Pitman Publishing Corporation (1944) or other reference works on photogrammetry for a comprehensive discussion of the principles of rectification. It is sufficient to explain herein that the original photographic transparency is projected by the projector 14 upon the first easel 20 forming thereon a partially rectified image. The second projection lens 22 then relays the partially rectified image from the first easel 20 to the second easel 26, forming a fully rectified image on the second easel. For maximum advantage, it is preferable to arrange the rectifier so that approximately equal degrees of rectification are accomplished in the first and second stages. As shown, the rectifier is arranged for a 1 to 1 magnification ratio on the isometric line of the photograph.

The rectifier is arranged to be operated in accordance with pre-computed data based on known conditions under which the particular photographs being rectified were taken. The various elements of the rectifier are all preset in accordance with the pre-completed data prior to the making of the exposure. The first and second easels 20 and 26, respectively, are angularly adjusted at the computed angles relative to the principal axes 35 and 37 of the first and second stages, respectively. Appropriate scales 39 and 41, respectively, are mounted adjacent to the respective pivots 12 and 28 for this purpose. The radius arm 16 is swung to bring the principal axis 35 of the first stage into the pre-computed alignment relative to the second principal axis 37. The projector lens 43 is swung upon its pivot 45, which is aligned on an axis passing through the optical center of the lens 43, and the lamp housing 32 is swung to adjust the angular position of the film plane 47 relative to the principal axis 35, to satisfy the Scheimpflug condition for critical focus. The lamp housing 32 is also laterally slidable on horizontal supports 49 and 51 so that the film may be shifted laterally to effect the desired pre-computed Y-displacement.

The projector 14 is also slidable longitudinally along the radius arm 16, thus providing for variable magnification when the rectifier is used as a single stage instrument. For simultaneous two-stage operation, however, the projector is preferably positioned for 1:1 magnification on the isometric line of the photograph.

As best seen in FIGURES 3 and 4, the film holder assembly (not separately designated) is also rotatable in its own plane, so that by a combination of this rotation with the Y-displacement, the isometric parallel can be brought into coincidence with the vertical axis of rotation of the lamp and film housing 32. (The isometric parallel is the line passing through the isocenter parallel to the photograph horizon.) The film holder includes a pair of confronting glass plates 53, which are separately mounted in frames 55 supported on a disc 57. The disc 57 also mounts the film spool brackets 59, and is rotatable on three angularly spaced idlers 61, which are separately journaled forwardly of the disc.

One problem in the simultaneous achievement of two stages of photographic rectification relates to the relative variation in illumination across the field. It will be seen that if the illumination is even across the film plane in the projector, it will be relatively dim in the relatively widely spread-out portions of the rectified images, and relatively bright in the condensed portions. A second problem relates to the relatively large absolute values of illumination required due to the unavoidably large, diffusion caused light losses at the first easel. A diffusing surface must be used here, with the result that only a relatively small portion of the light striking the diffusing surface reaches the second projection lens 22 for transmission to the second easel 26. Both of these problems, uniformity of exposure across the field and intensity of illumination, are overcome in the practice of the present invention by the unique illuminating system illustrated best in FIGS. 3 and 4.

The illuminating system includes a relatively high intensity tubular lamp 34, preferably of the xenon arc type, backed up by a cylindrical reactor 36. This type of lamp is capable of relatively high output and efficiency. The lamp 34 extends vertically across the film gate 47 of the projector, generally parallel to the pivot axes of the rectifier, and, together with the reector 36 is mounted on a follower nut 40, which is threaded on a drive screw 42. The drive screw 42 extends across the film gate 40 at the bottom thereof, and is geared, or otherwise connected to a motor 44 for drive thereby across the film gate 47. During an exposure, the lamp 34 is traversed across the film holder, successively illuminating the various successive incremental portions of the field. The drive may be either continuous or step-wise, and may be readily controlled by a programmed controller 46 (FIG. 1) of the punch card, or magnetic tape, or any other desired type in accordance with the rectification principles to provide substantially uniform exposure across the entire field of the final, fully rectified image.

What is claimed is:

1. A two-stage photographic rectifier for photogrammetric and like applications comprising a base, first and second pivots fixed on and rigidly supported by said base, said pivots being parallel to and laterally spaced from each other, first and second photographic easels respectively rotatable on said pivots with their front surfaces coincident with the respective pivot axes, a projection lens fixed between said pivots for imaging the front surface of said first easel upon the front surface of said second easel, a radius arm pivoted upon said first pivot, and a photographic projector mounted on said radius arm for projecting an image upon the front surface of said first easel, said projector being of the adjustable type having an angularly and laterally movable film holder and an angularly movable lens holder.

2. A two-stage photographic rectifier for photogrammetric and like applications comprising a base, first and second pivots fixed on and rigidly supported by said base, said pivots being parallel to and laterally spaced from each other, first and second photographic easels respectively rotatable on said pivots with their front surfaces coincident with the respective pivot axes, a projection lens fixed between said pivots for imaging the front surface of said first easel upon the front surface of said second easel, a radius arm pivoted upon said first pivot, a photographic projector mounted on said radius arm for projecting an image upon the front surface of said first easel, said projector being of the adjustable type having an angularly and laterally movable film holder and an angularly movable lens holder, and means for controlling the illumination of an image projected by said projector to effect relatively uniform illumination of the rectified image formed on one of said easels.

3. A two-stage photographic rectifier for photogrammetric and like applications comprising a base, first and second pivots fixed on and rigidly supported by said base, said pivots being parallel to and laterally spaced from each other, first and second photographic easels respectively rotatable on said pivots with their front surfaces coincident with the respective pivot axes, a projection lens fixed between said pivots for imaging the front surface of said first easel upon the front surface of said second easel, a radius arm pivoted upon said first pivot, and a photographic projector mounted on said radius arm for projecting an image upon the front surface of said first easel, said projector being of the adjustable type having an angularly and laterally movable film holder and an angularly movable lens holder, said photographic projector including an elongated lamp for illuminating the film plane of said projector, and means for controllably moving said lamp across the film plane in a direction normal to the length of said lamp thereby to equalize the illumination across the field of the rectified image being projected upon one of said easels, said lamp extending generally parallel to said pivots.

4. A two-stage photographic rectifier for photogrammetric and like applications comprising a base, first and second pivots fixed on and rigidly supported by said base, said pivots being parallel to and laterally spaced from each other, first and second photographic easels respectively rotatable on said pivots with their front surfaces coincident with the respective pivot axes, said easels being of the vacuum type and having perforated front surfaces for vacuum support of sheet material placed thereon, a projection lens fixed between said pivots for imaging the front surface of said first easel upon the front surface of said second easel, a radius arm pivoted upon said first pivot, and a photographic projector mounted on said radius arm for projecting an image upon the front surface of said first easel, said projector being of the adjustable type having an angularly and laterally movable film holder and an angularly movable lens holder.

No references cited.